United States Patent
Miranda

(10) Patent No.: US 10,648,454 B2
(45) Date of Patent: May 12, 2020

(54) CONTROL SYSTEM HAVING LOCAL AND CENTRAL CONTROLLERS FOR WIND TURBINE SYSTEM HAVING MULTIPLE ROTORS

(71) Applicant: VESTAS WIND SYSTEMS A/S, Aarhus N (DK)

(72) Inventor: Erik Carl Lehnskov Miranda, Randers SV (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 98 days.

(21) Appl. No.: 15/550,298

(22) PCT Filed: Feb. 12, 2016

(86) PCT No.: PCT/DK2016/050039
§ 371 (c)(1),
(2) Date: Aug. 10, 2017

(87) PCT Pub. No.: WO2016/128002
PCT Pub. Date: Aug. 18, 2016

(65) Prior Publication Data
US 2018/0283355 A1 Oct. 4, 2018

(30) Foreign Application Priority Data
Feb. 12, 2015 (DK) .......................... PA 2015 70079

(51) Int. Cl.
*G06F 19/00* (2018.01)
*F03D 7/04* (2006.01)
(Continued)

(52) U.S. Cl.
CPC .............. *F03D 7/047* (2013.01); *F03D 1/02* (2013.01); *G05B 19/042* (2013.01);
(Continued)

(58) Field of Classification Search
CPC ...... F03D 1/02; F03D 7/047; F05B 2220/706; F05B 2240/912; F05B 2270/20;
(Continued)

(56) References Cited

U.S. PATENT DOCUMENTS

2003/0168864 A1 9/2003 Heronemus et al.
2003/0170123 A1 9/2003 Heronemus
(Continued)

FOREIGN PATENT DOCUMENTS

CN 1836102 A 9/2006
GB 2443886 A 5/2008
(Continued)

OTHER PUBLICATIONS

Quad Array A better idea than just bigger, Paul Dvorak, Jun. 19, 2009, p. 1-8. (Year: 2009).*
(Continued)

*Primary Examiner* — Kidest Bahta
(74) *Attorney, Agent, or Firm* — Patterson + Sheridan, LLP

(57) ABSTRACT

A wind turbine system comprising a plurality of wind turbines mounted to a common support structure, wherein each of the plurality of wind turbines includes a rotor and a power generation system driven by the rotor, wherein the wind turbine system further comprises: localised control means including a plurality of local control modules, wherein each of the local control modules is operable to monitor the operation of a respective one of the plurality of wind turbines, and to issue local control commands thereto to achieve a set of local control objectives; and centralised control means configured to monitor the operation of the wind turbine system and provide centralised control commands to the plurality of wind turbines in order to achieve
(Continued)

a set of supervisory control objectives associated with at least two of the plurality of wind turbines.

18 Claims, 5 Drawing Sheets

(51) Int. Cl.
*F03D 1/02* (2006.01)
*G05B 19/042* (2006.01)

(52) U.S. Cl.
CPC ... *F05B 2220/706* (2013.01); *F05B 2240/912* (2013.01); *F05B 2270/20* (2013.01); *G05B 2219/2619* (2013.01); *Y02E 10/723* (2013.01); *Y02E 10/725* (2013.01); *Y02E 10/728* (2013.01)

(58) Field of Classification Search
CPC .......... G05B 19/042; G05B 2219/2619; Y02E 10/723; Y02E 10/725; Y02E 10/728
See application file for complete search history.

(56) References Cited

U.S. PATENT DOCUMENTS

| | | |
|---|---|---|
| 2004/0258521 A1 | 12/2004 | Wobben |
| 2006/0132993 A1* | 6/2006 | Delmerico ............ F03D 7/0284 361/20 |
| 2006/0233635 A1* | 10/2006 | Selsam ................... F03D 1/065 415/4.3 |
| 2008/0195255 A1* | 8/2008 | Lutze .................... F03D 7/0284 700/291 |
| 2009/0008939 A1 | 1/2009 | Pare et al. |
| 2010/0078940 A1* | 4/2010 | Kondo ................... F03D 7/047 290/44 |
| 2010/0135789 A1* | 6/2010 | Zheng .................. F03D 7/0224 416/1 |
| 2012/0010756 A1* | 1/2012 | Larsen ..................... H02J 3/16 700/289 |
| 2012/0029723 A1* | 2/2012 | Schugart ................. H02J 3/16 700/298 |
| 2013/0127173 A1 | 5/2013 | Lee et al. |
| 2013/0259686 A1* | 10/2013 | Blom .................... F03D 7/0276 416/1 |
| 2014/0062086 A1 | 3/2014 | Mata Dumenjo et al. |

FOREIGN PATENT DOCUMENTS

| | | |
|---|---|---|
| JP | 200485857 A | 3/2004 |
| WO | 2010/021585 A1 | 2/2010 |

OTHER PUBLICATIONS

Wind Turbine Power The Betz Limit and Beyond, Mahmaud et al., Mar. 20, 2012; pp. 1-30. (Year: 2012).*
Multi Rotor Systems for Large Unit Capacities Offshore, EERA Deepwind, Jan. 2014 , p. 1-26. (Year: 2014).*
International Search Report for PCT/DK2016/050039, dated May 17, 2016.
Danish Search Report for PA 2015 70079, dated Aug. 26, 2015.
Chinese Office Action for Application No. 201660015231.7 dated Sep. 28, 2018.

* cited by examiner

CONTROL SYSTEM HAVING LOCAL AND CENTRAL CONTROLLERS FOR WIND TURBINE SYSTEM HAVING MULTIPLE ROTORS

TECHNICAL FIELD

The invention relates to a control system comprising local controllers and central controllers for controlling a wind turbine system having multiple rotors.

BACKGROUND TO THE INVENTION

The most common type of wind turbine is the three-bladed upwind horizontal-axis wind turbine (HAWT), in which the turbine rotor is at the front of the nacelle and facing the wind upstream of its supporting turbine tower.

There exist a number of alternative wind turbine designs. One example is the multi-rotor array type wind turbine.

EP1483501B1 discloses a multi-rotor array-type wind turbine in which a plurality of co-planar rotors are mounted to a common support structure. Such a configuration achieves economies of scale that can be obtained with a very large single rotor turbine, but avoids the associated drawbacks such as high blade mass, scaled up power electronic components and so on. However, although such a co-planer multi-rotor wind turbine has its advantages, it presents challenges to implement the concept in practice, particularly in how to control the multiple rotors to achieve optimum power production. EP1483501B1 approaches the control strategy by treating each wind turbine of the system as a separate item that is controlled individually. It is against this background that the invention has been devised.

SUMMARY OF THE INVENTION

In one aspect the invention provides a wind turbine system comprising a plurality of wind turbines mounted to a common support structure, wherein each of the plurality of wind turbines includes a rotor and a power generation system driven by the rotor, wherein the wind turbine system further comprises:
  localised control means including a plurality of local control modules, wherein each of the local control modules is operable to monitor the operation of a respective one of the plurality of wind turbines, and to issue local control commands thereto to achieve a set of local control objectives;
  centralised control means configured to monitor the operation of the wind power system and provide centralised control commands to the plurality of wind turbines in order to achieve a set of supervisory control objectives associated with at least two of the plurality of wind turbines.

Advantageously, the system of the invention enables each of the wind turbines to optimise their own performance by adhering to local control objectives, whilst also taking part in centralised control objectives in order to improve the performance of the wind turbine system as a whole. The type of system of the invention may also be known as a 'multi-rotor wind turbine or wind power system', and each wind turbine may be referred to as a wind turbine module.

In one embodiment, the localised control means and the centralised control means are implemented on a common computing device. So, in such a configuration, computing resources may be concentrated in a single physical location, which may improve reliability since sensing of data and transmission of data is focus at a single point. The system may also therefore be more cost effective. In such a configuration, the localised control means and the centralised control means may be implemented on a common computing device, albeit functionally separated in suitable independent functional software modules. In alternative embodiments the localised control means and the centralised control means may be implemented on separate computing devices.

Where the localised control means and the centralised control means are implemented on separate computing devices, each one of the plurality of local control modules may be located at its respective wind turbine module, and the centralised control means may be located remote from the plurality of wind turbines, for example at a location in the support structure.

In a further aspect there is provided a method of a wind turbine system in accordance with the first aspect of the invention.

In general the aspects of the invention may be combined and coupled in any way possible within the scope of the invention.

BRIEF DESCRIPTION OF THE DRAWINGS

So that it may be more fully understood, the invention will now be described by way of example only to the following drawings, in which.

DETAILED DESCRIPTION OF EMBODIMENTS OF THE INVENTION

Figure 1:
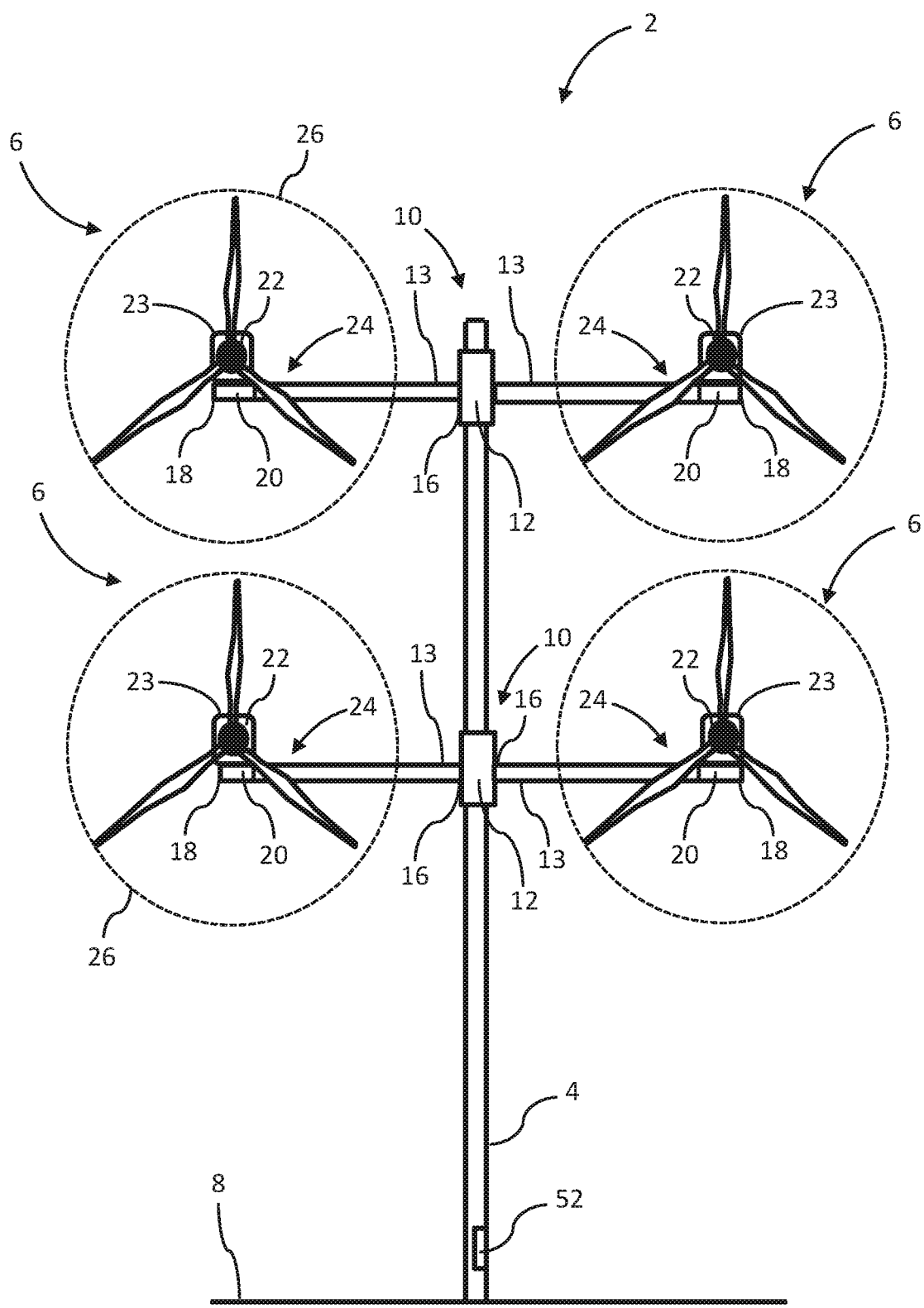
FIG. 1 is a front view of a multi-rotor wind turbine system.
Figure 2:
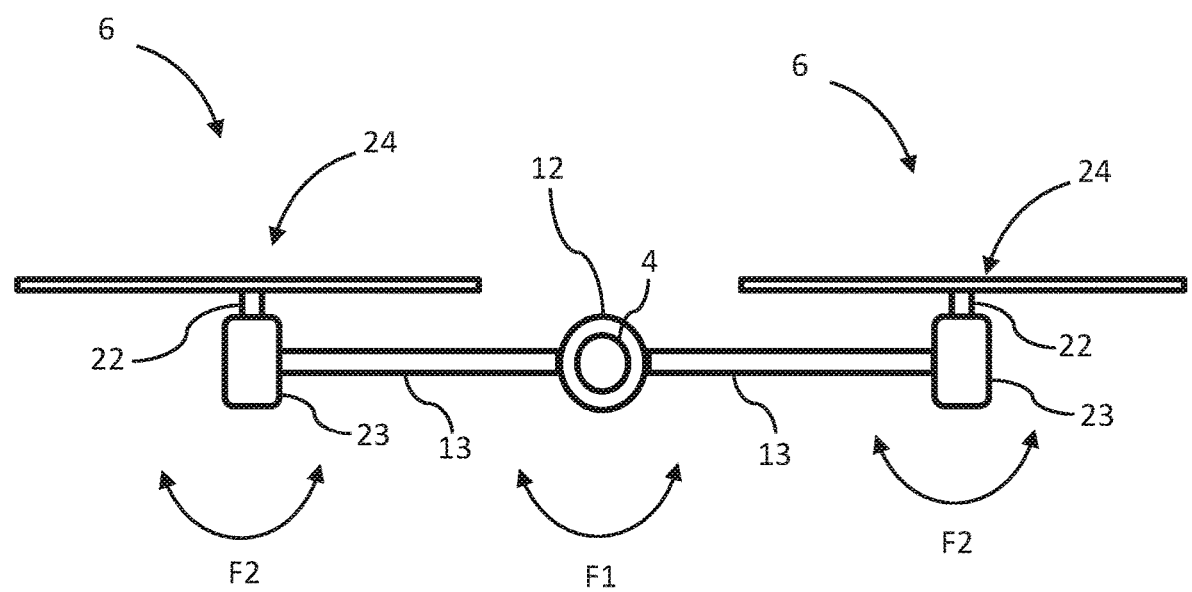
FIG. 2 is a top view of the multi-rotor wind turbine system in FIG. 1.

With reference to FIGS. 1 and 2, a wind turbine system 2 includes a support structure 4 on which is mounted a plurality of wind turbines 6 or wind turbine modules 6. In this embodiment, the support structure 4 is a slender tower that is mounted on a foundation 8, as is typical with modern wind turbines systems, although it should be appreciated that other support structures are possible, for example frame-like structures. Note that the term 'wind turbine' is used here in the industry-accepted sense to refer mainly to the generating components of the wind turbine system and as being separate to the support structure 4. Note also that the foundation 8 may be a large mass, e.g. concrete or steel, embedded in the ground, or may be in the form of a monopole or jacket structure in an offshore wind turbine installation.

In this embodiment, there are four wind turbines 6, and these are mounted to the support structure 4 in two pairs, each pair including two wind turbines 6 that are mounted to the support structure 4 by a support arm arrangement 10.

The support arm arrangement 10 comprises a mount portion 12 and first and second arms 13 that extend from the mount portion and carry a respective wind turbine 6. As such, each of the support arms 13 includes an inner end 16 connected to the mount portion 12 and an outer end 18 that is connected to a wind turbine 6.

The support arm arrangement 10 is mounted to the support structure 4 at the mount portion 12 so that the support arm arrangement 10 is able to yaw about the vertical axis of the support structure 4. Suitable yaw gearing (not shown) is provided for this purpose. This movement provides a first degree of freedom for the wind turbine 6 with respect to the support structure, as shown on FIG. 2 as 'F1'. This arrangement may be referred to as a central yaw arrangement. An alternative embodiment is envisaged in which each support arm arrangement 10 is mounted to a mount portion so that the two support arm arrangements 10 yaw at the same time. For example, the mount portion may be common to both support arm arrangements.

Furthermore, each wind turbine 6 may be arranged to to yaw left and right with respect to the support arm 13 on which it is mounted. For this purpose, the wind turbines 6 are mounted to their respective support arm 13 by a yaw unit 20, e.g. referred to as a module yaw unit. Mounting each of the wind turbines 6 on a module yaw unit 20 provides a second degree of freedom for the wind turbines 6 with respect to the support structure 2, as shown on FIG. 2 by 'F2'. In embodiments only a central yaw arrangement is present.

Each wind turbine 6 includes a rotor 22 that is rotatably mounted to a nacelle 23 in the usual way. The rotor 22 has a set of three blades 24 in this embodiment. Three-bladed rotors are the most common rotor configuration, but different numbers of blades are also known. Thus, the wind turbines 6 are able to generate power from the flow of wind that passes through the swept area or 'rotor disc' 26 associated with the rotation of the blades.

FIGS. 1 and 2 show the main structural components of the wind turbine system 2, although the skilled person would understand that the illustrated embodiment has been simplified in order not to obscure the invention with unnecessary detail. Further explanation will now be provided on the system component of the wind turbine system 2 with reference also to FIG. 3.

On a systems level, each wind turbine 6 may include a gearbox 30 that is driven by the rotor 22, and a power generation system including a generator 32 connected to the gearbox 30 and which feeds generated power to a converter system 34. A pitch control system 36 is also provided to control the angle of attack of the blades relative to the wind. The precise configuration of the generator 32 and converter system 34 are not central to the invention and will not be described in detail. However, for present purposes they can be considered to be conventional and, in one embodiment, may be based on a full scale converter (FSC) architecture or a doubly fed induction generator (DFIG) architecture, although other architectures would be known to the skilled person. Furthermore, in the illustrated embodiment each of the wind turbines can be considered to be substantially identical, so only one has been labelled fully in FIG. 3 for clarity. In general, the different wind turbine modules need not be identical. E.g. different rotor size, different generators, etc. can be used.

In the illustrated embodiment, the power output of the converter 34 of each wind turbine 6 is fed to a distribution unit 40 which has a function to receive power inputs 42 from the wind turbines 6 over suitable cabling 44 for onward transmission to a load 46, which is shown here as the electrical grid. Although not shown here it should be appreciated that the distribution unit 40 may be located in any suitable position, for example within the tower 4. The skilled person would be aware that different power conversion and transmission options exist, and it would be within the abilities of the skilled person to specify a suitable system. Thus this aspect is not described in further detail here.

It should be noted at this point that only a single wind turbine system 2 is described here, but that several such systems may be grouped together to form a wind power plant, also referred to as a wind farm or 'park'. In this case, a wind power plant control and distribution facility (not shown) would be provided to coordinate and distribute the power outputs from the individual wind turbine systems to the wider grid.

Since the wind turbine system 2 includes a plurality of wind turbines 6, each of which is operable to generate electrical power as the rotor is driven by the wind, the system includes localised control means 50 that is operable to monitor the operation of respective ones of the plurality of wind turbines and to issue commands thereto to achieve a set of local control objectives, as will be explained. In this embodiment, the localised control means 50 is provided in the form of a plurality of local control modules 50 that are embodied as respective computing devices each of which is dedicated to an associated wind turbine 6, 49.

The responsibility of the local control modules 50 is to monitor the operation of a specific wind turbine 6, 49 and control the operation of its various components to achieve local control objectives. For example, with reference to a single wind turbine 6, 49 for clarity, the local control module may:

monitor rotor speed and issue pitch control commands to the pitch control system 36 in order to track the nominal speed reference, which can be locally determined for each turbine, but may be set so as to be common across a group of the turbines, during above-rated power operating conditions;

issue generator control commands to the generator 32 in order to track an optimal wind power capture speed during below-rated power operating conditions;

issue yaw commands to the nacelle yaw unit 20 in order to maintain the nacelle in a correct attitude with respect to the wind so as to optimise power extraction;

issue pitch and generator control commands to reduce blade and thrust loads;

issue individual blade pitch commands to reduce local blade and nacelle tilt and yaw loads;

protect local turbines against high loads or unusual operating condition by shutting down or de-rating the affect turbines. Such conditions could be high component temperature, excessive vibration, over speed, sensor and actuator system faults, by way of example.

In summary, as a group the local control modules 50 are responsible for controlling the functionality of each wind turbine 6 individually in a way that ignores the interaction between the wind turbine 6 and the rest of the multi-rotor wind turbine system 2. So, the localised control modules 50 are specifically directed to optimising the performance of a respective wind turbine 6 in line with an associated set of local control objectives and do not take into account how the operation of the other wind turbines 6 or the support structure 2 may influence how the individual wind turbines should be operated as a wider group.

In order to provide a coordinated control strategy, the wind turbine system 2 also includes a centralised control means 52 which is configured to monitor the operation of the wind power system, that is to say the wind turbines 6 and the support structure 4, and to provide centralised control commands to the plurality of wind turbines 6 in order to achieve a set of supervisory control objective to the wind turbines as a group. In this embodiment, the centralised control means 52 is provided by a central control module being a computing device incorporated in the central control and distribution unit 40. Here, the central control module 52 may be located inside the support structure 4.

Figure 3:
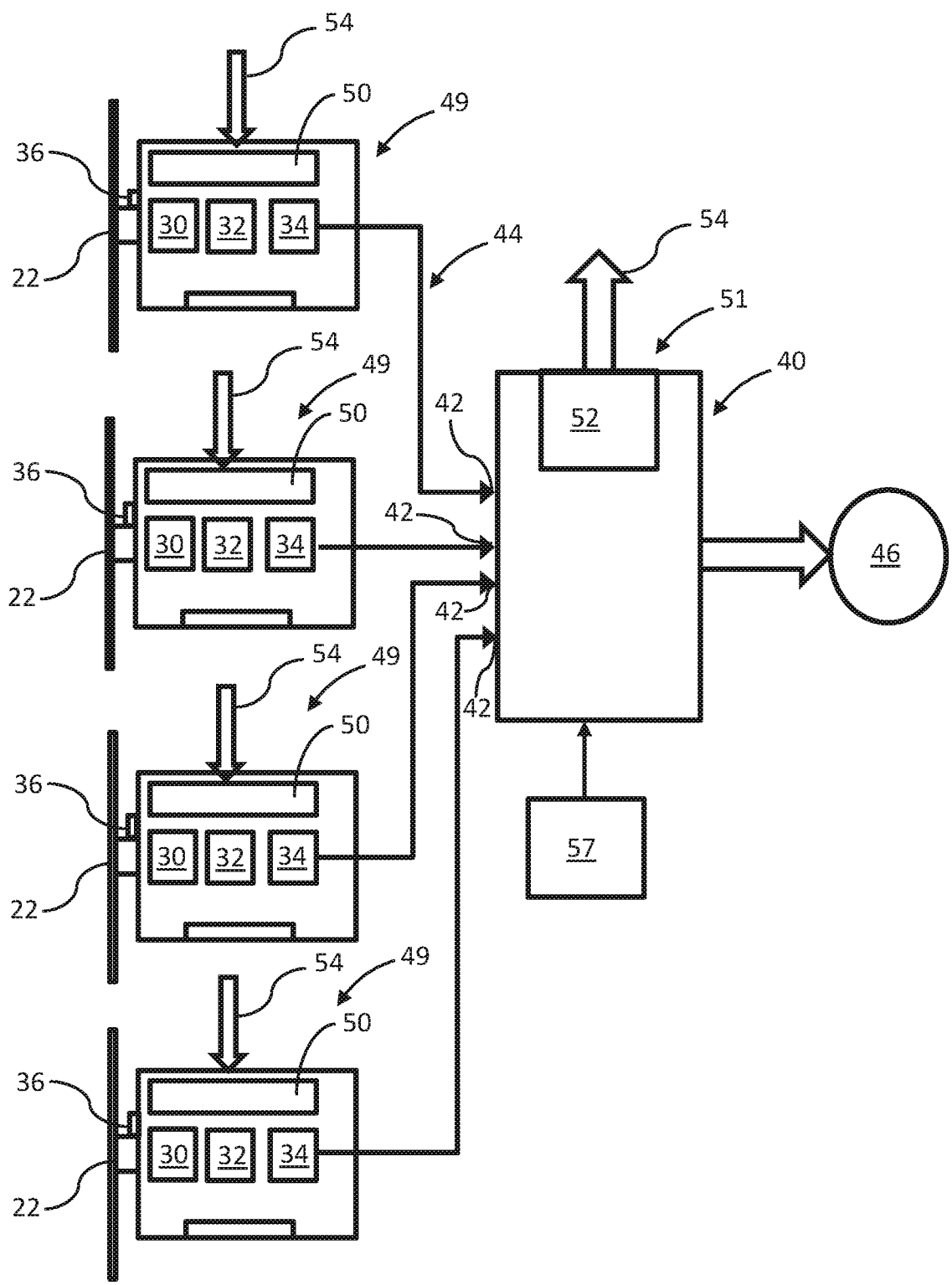
FIG. 3 is a schematic view of an embodiment of a control system for the multi-rotor wind turbine system of FIGS. 1 and 2.

The central control module 52 achieves control over each of the wind turbines 6 by providing control commands thereto. As shown in FIG. 3, the central control module 52 outputs control commands 54 which are received by each one of the wind turbines 6 and, more particularly, are received by the local control modules 50. The control commands 54 may be of the 'broadcast' type of command in which the same command is sent out to each wind turbine 6, or the commands may be of the 'directed' type of command in which a specific control command is set to a selected one or more, but not all, of the wind turbines 6.

It will be noted that FIG. 3 is a schematic view, so the way in which the control commands 54 are transferred to the wind turbines 6 is not depicted explicitly. However, it will be appreciated that suitable cabling may exist in the wind turbine system that interconnects the central control unit 52 to the wind turbines 6, and more specifically to the local control modules 50. The interconnections may be direct or 'point to point' connections, or may be part of a localised area network (LAN) operated under a suitable protocol (CAN-bus or Ethernet for example). Also, it should be appreciated that rather than using cabling, the control commands 54 may be transmitted wirelessly over a suitable wireless network, for example operating under WIFi™ or ZigBee™ standards (IEEE802.11 and 802.15.4 respectively).

The objective of the central control module 52 is to implement a harmonious control strategy for the group of wind turbines 6 so that their interactions between each other, and the interactions between the wind turbines 6 and the support structure 4 are managed in the most effective way. Expressed another way, the central control module 52 applies a higher level control strategy to the operation of the wind turbine system 2, whereas the local control modules 50 apply a lower level control strategy to each respective wind turbine 6 individually. However, both 'levels' of the control strategy operate together harmoniously in order to optimise the performance of the wind power system 2, both in terms of absolute power production, production efficiency, and fatigue optimisation.

In an embodiment the central control unit is further arranged to determine the set of local control objectives and provide the local control objectives to the plurality of wind turbines. In this manner it may be ensured that local control strategies does not conflict with each other, or at least should conflicting circumstances arise, e.g. certain operational conditions, the central control unit can take this into account and provide suitable local control objectives for the local controllers.

The following embodiments are given by way of example to illustrate how the central control module 52 would function to control the wind turbines 6.

In one embodiment, it is envisaged that a pair of wind turbines 6 that are located close together, for example two of the wind turbines 6 that are associated with a common support arm arrangement 10, interact aerodynamically such that their rotor speeds become synchronised. This is sometimes referred to as 'lock in'. This may be undesirable since one or both of the effected wind turbines 6 may start to operate at a speed that is not optimal for the prevailing wind conditions. In this circumstance, the central control module 52 is operable to monitor the rotational speeds of the wind turbines 6 and take action if a lock-in condition is detected or predicted. For example, the central control module 52 may issue control commands 54 to the local control modules 50 of the effected wind turbines to remedy the situation, this may be achieved by adjusting the gains of the speed control function of the wind turbines 6.

In another embodiment, the central control module 52 may be operable to detect dangerous icing conditions of the blades. This may be achieved by monitoring the loading at the blade roots and identifying any changes that are indicative of ice accretion. The skilled person will appreciate that other techniques exist for monitoring ice build-up on blades. For example, ice accretion may be determined through the detection of rotor imbalances, or through monitoring of the actual power curve compared to a theoretical power curve at a predetermined low temperature.

In this embodiment, the central control module 52 could be configured to take action to shut all of the wind turbines down, or shut down selected ones of the wind turbines, depending on the severity of the ice accretion. This will reduce the risk of ice being thrown off the blade and causing damage.

In an embodiment, the load supervising module may further be used in connection with a derate situation where the turbine is instructed from an external operator to derate its production. The load supervising module may determine which wind turbine(s) to derate. E.g. a pair of turbines may be derated while keeping the other pair at rated production, or alternatively all wind turbines may be derated, possibly at different rates.

In the above embodiments, the central control module 52 is configured to monitor the wind turbines 6, to assess whether there is any undesired interaction between the wind turbines 6, and then to take action to resolve that interaction.

However, in addition to managing the interaction between the wind turbines 6, the central control unit module 52 may also be operable to monitor the interaction between the wind turbines 6 and the support structure 4 and to issue central control commands 54 to the wind turbines 6 to manage that interaction so as to avoid unwanted effects.

In an embodiment, the central control unit may be arranged to determine a central control command for a wind turbine by taking into account structural and/or aerodynamic interactions between the wind turbines or wind turbine modules. In this manner it can be avoided that operation of one turbine does not adversely affect operation of another turbine, or a structural component of the wind turbine system.

By way of example, the central control module 52 may be configured to monitor the loading imposed on the support structure 4 gathered through a suitable sensor suite 57 by the wind turbines 6 and to take action to reduce the loading, or to counteract oscillations of the tower created as a result of the loading. In more detail, during operation of the wind turbines 6 the support structure 4 is excited with both static and dynamic loads. An example of a static load is the thrust produced by the rotor during operation which acts generally in line with the rotor axis. Torque is also produced by rotation of the rotor. Dynamic loads may be produced for example by wind gusting and wake effects from upstream wind turbine systems, by resonances that excite the structure of the turbine at certain rotor speeds, or by aerodynamic instability of the blades which can generate edge- and flap-wise blade vibrations which are transmitted into the structure of the wind turbine.

In general aerodynamic interferences may cause unwanted loads. Such unwanted loads may be handled by the central controller. In one embodiment an asymmetric loading on the wind turbine modules may be handled by the central controller by derating the wind turbine module(s) which is loaded the highest. As an example, a gust hitting the wind turbine system in an asymmetric manner may be handled by derating the wind turbine module(s) which are affected most and allowing the wind turbine module(s) which are effected the least to increase the power uptake. In this manner, the power production may be kept constant during the gust without excessive loading of the wind turbine modules.

Thrust differences between two of the wind turbines associated with the same support arm arrangement 10 are undesirable because those differences create large yaw loads at the point the mount portion 12 is attached to the support structure 4. A difference in thrust between two paired wind turbines could occur due to different reasons, for example due to a relative difference in wind speed or wind direction experienced by the wind turbines, or where the blades of one wind turbine are more contaminated with ice or dirt which would reduce the aerodynamic efficiency of the blades. Such yaw loads may be measured in different ways. For example, the thrust on the wind turbines 6 may be estimated from measurements of the power, generator speed and acceleration, and blade pitch angle. Such a technique is based on numerical calculations from sensors incorporated in the rotor hub and the nacelle. Alternatively, the yaw loading can be measured by interpreting strain gauge data on the support arm close to the support structure 4. Physical movement of the support structure 4 and the wind turbines 6 may be measured by suitable accelerometers attached to the system at suitable positions.

Once the central control module 52 has calculated the yaw loading on the support structure, it may then be operable to issue control commands 54 to the wind turbines 6 in order to counteract the yaw loading. For example, the control commands 54 may cause the pitch control system to vary the blade pitch settings on one wind turbine to a reduced value in order to balance the thrust loads applied by a pair of wind turbines 6 mounted on the same support arm arrangement.

The central control module 52 could also be configured to take action to address the noise generated by the wind turbines 6 and, to this end, the central control module 52 could control all of the wind turbines together to reduce noise, or could control the wind turbines in different ways to control the noise profile as well as achieving an overall reduction in noise generation.

In a further example, a fault in one rotor may be compensated by the other non-faulty rotor modules. For example the central control may be arranged to determine that an accepted load level may be obtained in derated operation, even with one or more wind turbine modules not working properly.

In general, in the event of any disagreement or conflict between the system control commands determined by the local control modules and those determined by the central control module, the control commands from the central control module will take priority. However, it is envisaged that an exception to this rule will be for safety related functions that are implemented locally at each individual wind turbine, for example functions that act to limit maximum rotor speed, vibration monitoring and critical actuator errors.

Figure 4:
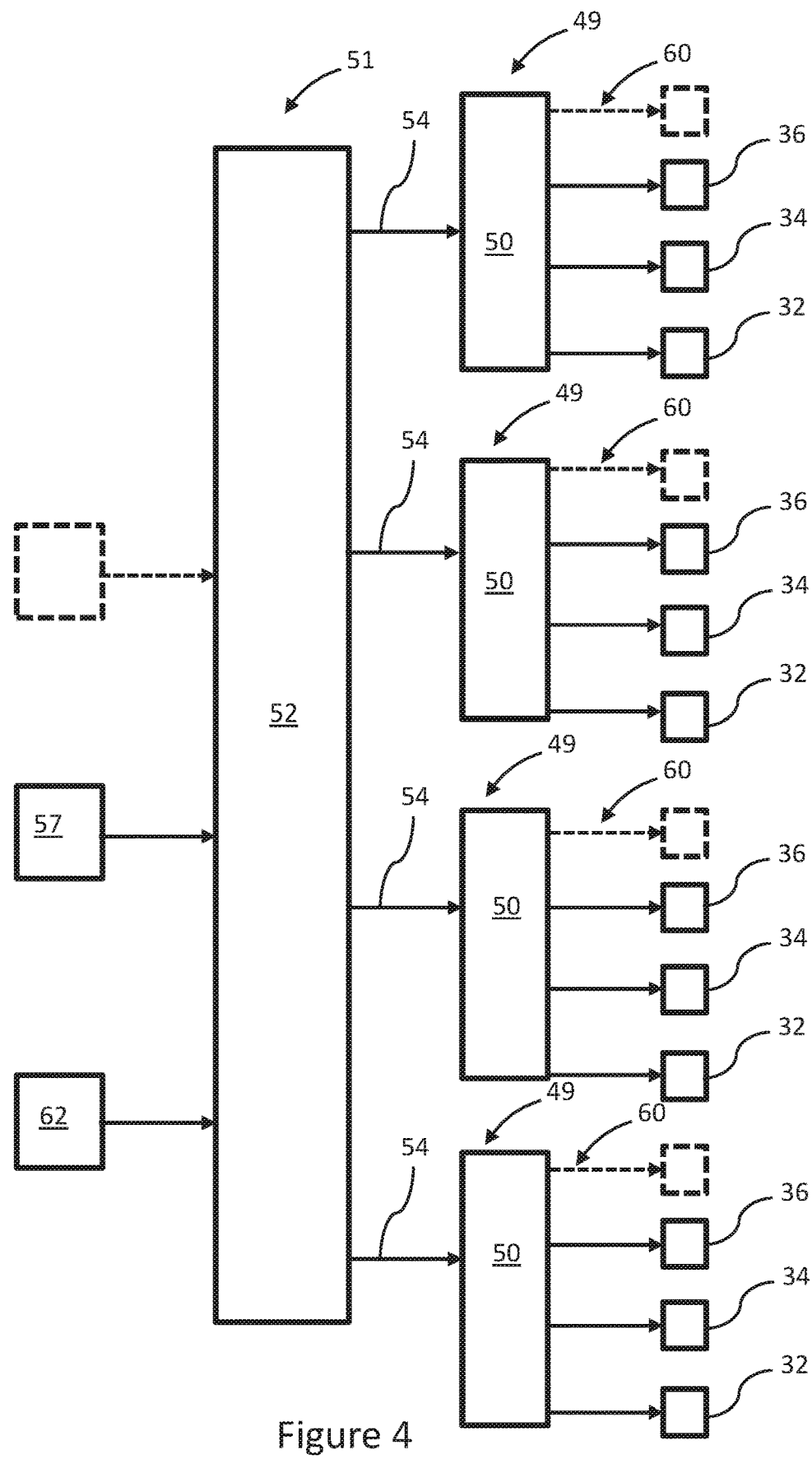
FIG. 4 is an alternative view of the control system in FIG. 3.

FIG. 4 illustrates the hierarchical control strategy of the wind turbine system in an alternative way. Here, it can be seen that the centralised control means 51 provides a supervisory control function to the localised control means 49 and therefore communicates with each of the local control modules 52. The local control modules 50 issue local control commands 60 to each controllable sub-system within the wind turbine, for example the generator 32, the converter 34 and the pitch control system 36. Of course, it should be noted that these are provided by way of example and other sub-systems may be included within the control boundary of the local control units 50.

At the second level of the hierarchy, the centralised control unit 52 coordinates various control demands and sensor data from the wind turbine system 2 and implements a supervisory control strategy in order to manage the wind turbine 6 in the most productive way. Shown here, the central control module 52 receives control demands from a grid operator controller 62 and sensor data 57 and outputs control commands 54 to each of the local control modules 50 of the wind turbines 6. The centralised control module 52 can here be considered to be a supervisory controller of the wind turbine system 2.

As shown in FIG. 3, the localised control means 49 is implemented as local control modules 50 that are located at each of the wind turbines, and the centralised control means 52 is implemented as a central control module located at the control and distribution unit 40. Thus, the localised control means and the centralised control means are implemented on separate computing platforms.

However, although the illustrated embodiment is one way of configuring the hierarchical control architecture of the invention, embodiments are envisaged in which the hierarchical architecture is implemented in different ways.

Figure 5:
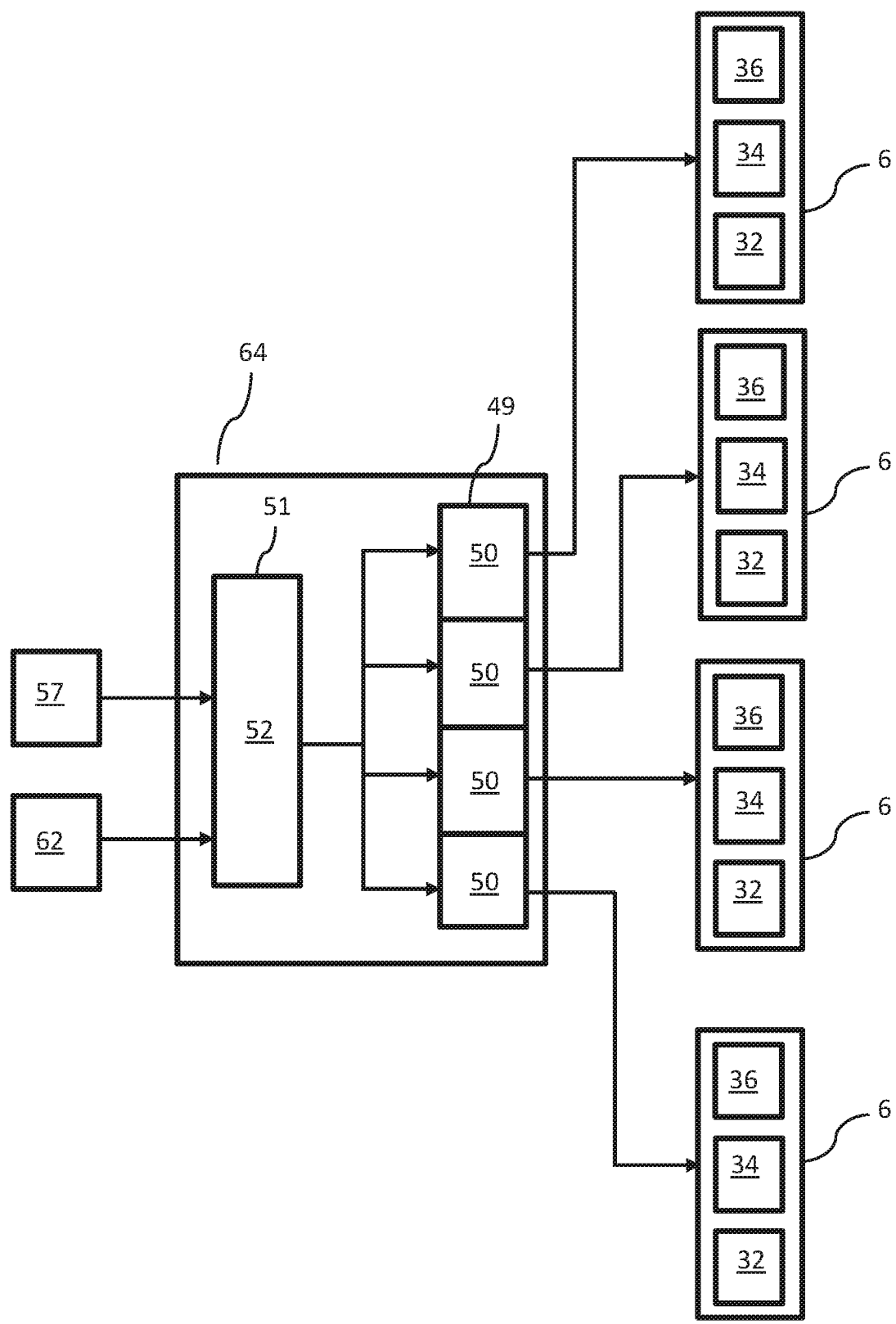
FIG. 5 is a schematic view of an alternative control system to that shown in FIG. 4.

For example, in one alternative embodiment, as illustrated in FIG. 5, the localised control means 49 and the centralised control means 51 are provided on a common computing platform 64. Here the centralised control means 51 receives the same data as the previous embodiment. However, rather than communicating control commands 54 to the local control units 50 that are positioned separately in their respect wind turbines 6, here the control commands 54 are simply transferred to different processing modules within the same computing platform 64. It will be appreciated that the processing modules may be implemented on separate hardware units, but also that the processing modules could be implemented as functionally separate software modules in a common hardware environment.

The skilled person will appreciated that modifications may be made to the specific embodiments described above without departing from the inventive concept as defined by the claims.

For example, although in the embodiment of FIG. 3 the local control units 50 are shown as being located within the nacelles 23 of the wind turbines 6, this need not be the case, and embodiments are envisaged in which the local control units are mounted in different locations, for example on the support arms 13 close to the support structure 4. This may provide the local control units 50 in a more convenient position for maintenance access.

Also, it should be appreciated that although the illustrated embodiment includes four wind turbines mounted to the support structure, this is to illustrate the principle of the proposed hierarchical control system which may be applied to wind turbine systems with more than four wind turbines. Moreover, embodiments are envisaged in which the wind turbines are not paired in groups of two, as in the illustrated embodiment, but are arranged differently and not necessarily having a co-planar relationship.

The invention claimed is:

1. A wind turbine system comprising:
a plurality of wind turbines mounted to a common support structure, wherein each of the plurality of wind turbines includes a rotor and a power generation system driven by the rotor;
a plurality of local control modules, wherein each of the plurality of local control modules is operable to:
monitor the operation of a respective wind turbine of the plurality of wind turbines; and
issue local control commands to the respective wind turbine according to one or more local control objectives specific to the respective wind turbine; and
a central control module configured to:
monitor the operation of the wind turbine system, wherein monitoring the operation of the wind turbine system comprises:
monitoring rotor speeds of a first wind turbine and a second wind turbine of the plurality of wind turbines; and
detecting or predicting a synchronization of the rotor speeds;
determine, according to one or more supervisory control objectives applied to the plurality of wind turbines, central control commands that account for one or both of structural interactions and aerodynamic interactions between at least two of the plurality of wind turbines, wherein determining the central control commands comprises determining a first central control command for the first wind turbine to cause the rotor speeds to become, or to remain, unsynchronized; and
provide the central control commands to the plurality of local control modules.

2. The wind turbine system of claim 1, wherein the plurality of local control modules and the central control module are implemented on a common computing device.

3. The wind turbine system of claim 1, wherein the plurality of local control modules and the central control module are implemented on separate computing devices.

4. The wind turbine system of claim 3, wherein each one of the plurality of local control modules is located at its respective wind turbine.

5. The wind turbine system of claim 1, wherein the central control module is located remote from the plurality of wind turbines.

6. The wind turbine system of claim 5, wherein the central control module is located on the common support structure.

7. The wind turbine system of claim 1, wherein the central control commands provided by the central control module override the local control commands issued by the plurality of local control modules in the event of a conflict.

8. The wind turbine system of claim 1, wherein the local control commands are directed to optimize a power production of each respective wind turbine.

9. The wind turbine system of claim 1, wherein the central control module is further configured to:
determine the one or more local control objectives; and
provide the one or more local control objectives to the plurality of local control modules.

10. The wind turbine system of claim 1, wherein the central control commands further account for interactions between the support structure and the plurality of wind turbines.

11. The wind turbine system of claim 1, wherein the first central control command for the first wind turbine adjusts a gain of a speed control function of the first wind turbine.

12. A method of operating a wind turbine system comprising a plurality of wind turbines mounted to a common support structure, wherein each of the plurality of wind turbines includes a rotor and a power generation system driven by the rotor, wherein the method comprises:
using each local control module of a plurality of local control modules:
monitoring operation of a respective wind turbine of the plurality of wind turbines; and
issuing local control commands to the respective wind turbine according to one or more local control objectives specific to the respective wind turbine:
monitoring rotor speeds of a first wind turbine and a second wind turbine of the plurality of wind turbines;
detecting or predicting a synchronization of the rotor speeds;
determining, according to one or more supervisory control objectives applied to the wind turbines, central control commands that account for one or both of structural interactions and aerodynamic interactions between at least two wind turbines of the plurality of wind turbines, wherein determining the central control commands comprises determining a first central control command for the first wind turbine to cause the rotor speeds to become, or to remain, unsynchronized; and
providing the central control commands to the plurality of local control modules.

13. A wind turbine system comprising:
a plurality of wind turbines mounted to a common support structure, wherein each of the plurality of wind turbines includes a rotor and a power generation system driven by the rotor;
a plurality of local control modules, wherein each of the plurality of local control modules is operable to:
monitor the operation of a respective wind turbine of the plurality of wind turbines; and
issue local control commands to the respective wind turbine according to one or more local control objectives specific to the respective wind turbine; and
a central control module configured to:
monitor the operation of the wind turbine system, wherein monitoring the operation of the wind turbine system comprises:
detecting an icing condition of a rotor blade of a first wind turbine of the plurality of wind turbines;
determine, according to one or more supervisory control objectives applied to the plurality of wind turbines, central control commands that account for one or both of structural interactions and aerodynamic interactions between at least two of the plurality of wind turbines, wherein determining the central control commands comprises determining a first central control command to shut down at least the first wind turbine; and
provide the central control commands to the plurality of local control modules.

14. The wind turbine system of claim 13, wherein detecting the icing condition of the rotor blade of the first wind turbine comprises one of:
monitoring loading at a blade root of the rotor blade;
detecting a rotor imbalance of the rotor of the first wind turbine; and
comparing an actual power curve of the first wind turbine with a theoretical power curve.

15. A wind turbine system comprising:
a plurality of wind turbines mounted to a common support structure, wherein each of the plurality of wind turbines includes a rotor and a power generation system driven by the rotor;
a plurality of local control modules, wherein each of the plurality of local control modules is operable to:
monitor the operation of a respective wind turbine of the plurality of wind turbines; and
issue local control commands to the respective wind turbine according to one or more local control objectives specific to the respective wind turbine; and
a central control module configured to:
monitor the operation of the wind turbine system, wherein monitoring the operation of the wind turbine system comprises:
detecting asymmetric loading of the plurality of wind turbines, wherein a first wind turbine of the plurality of wind turbines is loaded more heavily than a second wind turbine of the plurality of wind turbines;
determine, according to one or more supervisory control objectives applied to the plurality of wind turbines, central control commands that account for one or both of structural interactions and aerodynamic interactions between at least two of the plurality of wind turbines, wherein determining the central control commands comprises determining a first central control command to derate at least the first wind turbine; and
provide the central control commands to the plurality of local control modules.

16. The wind turbine system of claim 15, wherein determining the central control commands further comprises:
determining a second central control command to increase power uptake of at least one other wind turbine of the plurality of wind turbines,
wherein a power production of the wind turbine system is kept constant.

17. A wind turbine system comprising:
a plurality of wind turbines mounted to a common support structure, wherein each of the plurality of wind turbines includes a rotor and a power generation system driven by the rotor;
a plurality of local control modules, wherein each of the plurality of local control modules is operable to:
monitor the operation of a respective wind turbine of the plurality of wind turbines; and
issue local control commands to the respective wind turbine according to one or more local control objectives specific to the respective wind turbine; and
a central control module configured to:
monitor the operation of the wind turbine system, wherein monitoring the operation of the wind turbine system comprises:
detecting a thrust difference between a first wind turbine and a second wind turbine that are mounted on a support arm arrangement mounted on the common support structure, wherein the thrust difference results in a yaw loading on the common support structure;
determine, according to one or more supervisory control objectives applied to the plurality of wind turbines, central control commands that account for one or both of structural interactions and aerodynamic interactions between at least two of the plurality of wind turbines, wherein determining the central control commands comprises determining a first central control command for the first wind turbine to counteract the yaw loading; and
provide the central control commands to the plurality of local control modules.

18. The wind turbine system of claim 17,
wherein the first central control command for the first wind turbine reduces a pitch setting of rotor blades of the first wind turbine to mitigate the thrust difference.

* * * * *